US009691141B2

(12) United States Patent
Shin et al.

(10) Patent No.: US 9,691,141 B2
(45) Date of Patent: Jun. 27, 2017

(54) IMAGE CORRECTION DEVICE FOR ACCELERATING IMAGE CORRECTION AND METHOD FOR SAME

(71) Applicant: SK TELECOM CO., LTD., Seoul (KR)

(72) Inventors: Seung-ho Shin, Incheon (KR); Ki-mun Kim, Seongnam-si (KR)

(73) Assignee: SK TELECOM CO., LTD., Seoul (KR)

( * ) Notice: Subject to any disclaimer, the term of this patent is extended or adjusted under 35 U.S.C. 154(b) by 86 days.

(21) Appl. No.: 14/697,561

(22) Filed: Apr. 27, 2015

(65) Prior Publication Data

US 2015/0228061 A1    Aug. 13, 2015

Related U.S. Application Data

(63) Continuation of application No. PCT/KR2013/009517, filed on Oct. 24, 2013.

(30) Foreign Application Priority Data

Oct. 26, 2012 (KR) .................. 10-2012-0119505

(51) Int. Cl.
*G06K 9/00* (2006.01)
*G06T 5/50* (2006.01)
(Continued)

(52) U.S. Cl.
CPC ............... *G06T 5/50* (2013.01); *G06T 5/001* (2013.01); *G06T 5/20* (2013.01);
(Continued)

(58) Field of Classification Search
CPC ......... G06T 3/4015; G06T 5/001; G06T 5/20; G06T 5/50; G06T 2207/10016;
(Continued)

(56) References Cited

U.S. PATENT DOCUMENTS 7,599,578 B2 * 10/2009 Utagawa ................. G06T 5/008
382/167
2006/0062562 A1 * 3/2006 Utagawa ................. G06T 5/008
396/213
(Continued)

FOREIGN PATENT DOCUMENTS

CN       101102398 A     1/2008
JP     2003057751 A *    2/2003
(Continued)

OTHER PUBLICATIONS

International Search Report for PCT/KR2013/009517 dated Jan. 29, 2014, citing the above reference(s).
(Continued)

*Primary Examiner* — Mekonen Bekele
(74) *Attorney, Agent, or Firm* — Hauptman Ham, LLP

(57) ABSTRACT

A video correction apparatus includes: a resolution adjuster to determine resolution values and a filter coefficient of at least one filter for performing filtering process, and adjust an initial resolution of the color component of the input image to the resolution values to generate resolution-adjusted images; an illumination component extractor to extract illumination components by using the color component of the input image and the at least one filter; a reflection component extractor to extract reflection components of the resolution-adjusted images by removing the illumination components from the resolution-adjusted images; a color adjuster to generate sum images by using the reflection components and the resolution-adjusted images; and an image synthesizer to generate readjusted images by readjusting the resolutions of the sum images to the initial resolution of the color component of the input image, and generate a corrected image corresponding to the color component of the input image.

20 Claims, 5 Drawing Sheets

(51) Int. Cl.
*G06T 5/00* (2006.01)
*G06T 5/20* (2006.01)

(52) U.S. Cl.
CPC ............... *G06T 2207/10016* (2013.01); *G06T 2207/10024* (2013.01); *G06T 2207/20024* (2013.01); *G06T 2207/20216* (2013.01)

(58) Field of Classification Search
CPC . G06T 2207/10024; G06T 2207/20024; G06T 2207/20216
USPC ................ 382/276, 167, 162, 166, 274, 309
See application file for complete search history.

(56) References Cited

U.S. PATENT DOCUMENTS

| | | | |
|---|---|---|---|
| 2010/0053043 A1* | 3/2010 | Sakamoto | H01L 27/3213 345/77 |
| 2010/0256469 A1* | 10/2010 | Cook | A61B 5/14542 600/323 |
| 2012/0032973 A1* | 2/2012 | Sano | G01J 3/504 345/593 |
| 2013/0050620 A1* | 2/2013 | Shin | G02F 1/133514 349/106 |

FOREIGN PATENT DOCUMENTS

| | | |
|---|---|---|
| JP | 2012089076 A | 5/2012 |
| KR | 100806201 B1 | 2/2008 |
| KR | 100818479 B1 | 4/2008 |
| KR | 1020080105272 A | 12/2008 |
| KR | 1020110056098 A | 5/2011 |

OTHER PUBLICATIONS

Kie Long Kun & Lee Ok Bong, "Enhancement Methods Research on the Degraded Color Images in FOG", 16 pages, Jul. 16, 2012.

\* cited by examiner

IMAGE CORRECTION DEVICE FOR ACCELERATING IMAGE CORRECTION AND METHOD FOR SAME

CROSS-REFERENCE TO RELATED APPLICATIONS

The present application is a continuation of International Patent Application No. PCT/KR2013/009517, filed on Oct. 24, 2013, which is based upon and claims the benefit of priority to Korean Patent Application No. 10-2012-0119505, filed on Oct. 26, 2012. The disclosure of the above-listed applications are hereby incorporated by reference herein in their entirety.

TECHNICAL FIELD

The present disclosure in one or more embodiments relates to a video correction apparatus and method for accelerating video compensation.

BACKGROUND

The statements in this section merely provide background information related to the present disclosure and do not necessarily constitute prior art.

Human vision is readily capable of discerning between structures and surrounding areas, even in blurred video images due to elements such as fog and dust. However, images captured by a video capturing device in such an environment tend to lose most of feature points. The inventor(s) has noted that to reduce the gap that exists between the image and the human visual perception capability, there have been various studies conducted, proposing Retinex algorithms as a result. The inventor(s) has noted that mimicking the color discrimination mechanism of the human visual system, the Retinex algorithm is a method for separating the human influential illumination component from a reflection component which reflects the characteristics of the image for removing the illumination component effect and emphasizing the reflection component to compress the dynamic range of the input image and improve the contrast.

Meanwhile, the Retinex algorithm estimates the illumination component of the image by using a Gaussian filter. The inventor(s) has noted that when the input image is in color, it is necessary to repeatedly apply each of the color components R, G and B to the Gaussian filter. Furthermore, the inventor(s) has noted that when utilizing a plurality of Gaussian filters with different filter coefficients, each of the Gaussian filters needs to process each of the color components R, G and B, which increases the computation amount, thereby preventing image correction from being processed in real time. The inventor(s) has experienced that the higher the resolution of the image gets, the more ineffective the method becomes.

SUMMARY

In accordance with at least one embodiment of the present disclosure, a video correction apparatus comprises a resolution adjuster, an illumination component extractor, a reflection component extractor, a color adjuster, and an image synthesizer. The resolution adjuster is configured to determine one or more resolution values and a filter coefficient of at least one filter for performing filtering process for extracting an illumination component from a color component of an input image, and adjust an initial resolution of the color component of the input image to the one or more resolution values to generate one or more resolution-adjusted images. The illumination component extractor is configured to extract one or more illumination components by using the color component of the input image and the at least one filter. The reflection component extractor is configured to extract one or more reflection components of the one or more resolution-adjusted images by removing the one or more illumination components from the one or more resolution-adjusted images. The color adjuster is configured to generate one or more sum images by using the one or more reflection components and the one or more resolution-adjusted images. And the image synthesizer is configured to generate one or more readjusted images by readjusting the one or more resolutions of the one or more sum images to the initial resolution of the color component of the input image, and generate a corrected image corresponding to the color component of the input image by using the one or more readjusted images.

In accordance with another embodiment of the present disclosure, a video correction apparatus including a Gaussian filter coefficient calculator, a resolution adjuster, an illumination component extractor, a reflection component extractor, a color adjuster, and an image synthesizer, the method comprises: extracting a filter coefficient of at least one Gaussian filter, the filter coefficient used for performing a filtering process for extracting an illumination component from a color component image; performing a resolution adjustment including extracting an optimized resolution for the filtering process based on the filter coefficient, and adjusting an initial resolution of the color component image to the optimized resolution; extracting the illumination component from the color component image having the adjusted resolution; extracting a reflection component of the color component image having the adjusted resolution by removing the extracted illumination component from the color component image having the adjusted resolution; generating a sum image by adding the extracted reflection component to the color component image having the adjusted resolution; and generating a corrected image by readjusting a resolution of the sum image into the initial resolution of the color component image.

DETAILED DESCRIPTION

Figure 1:
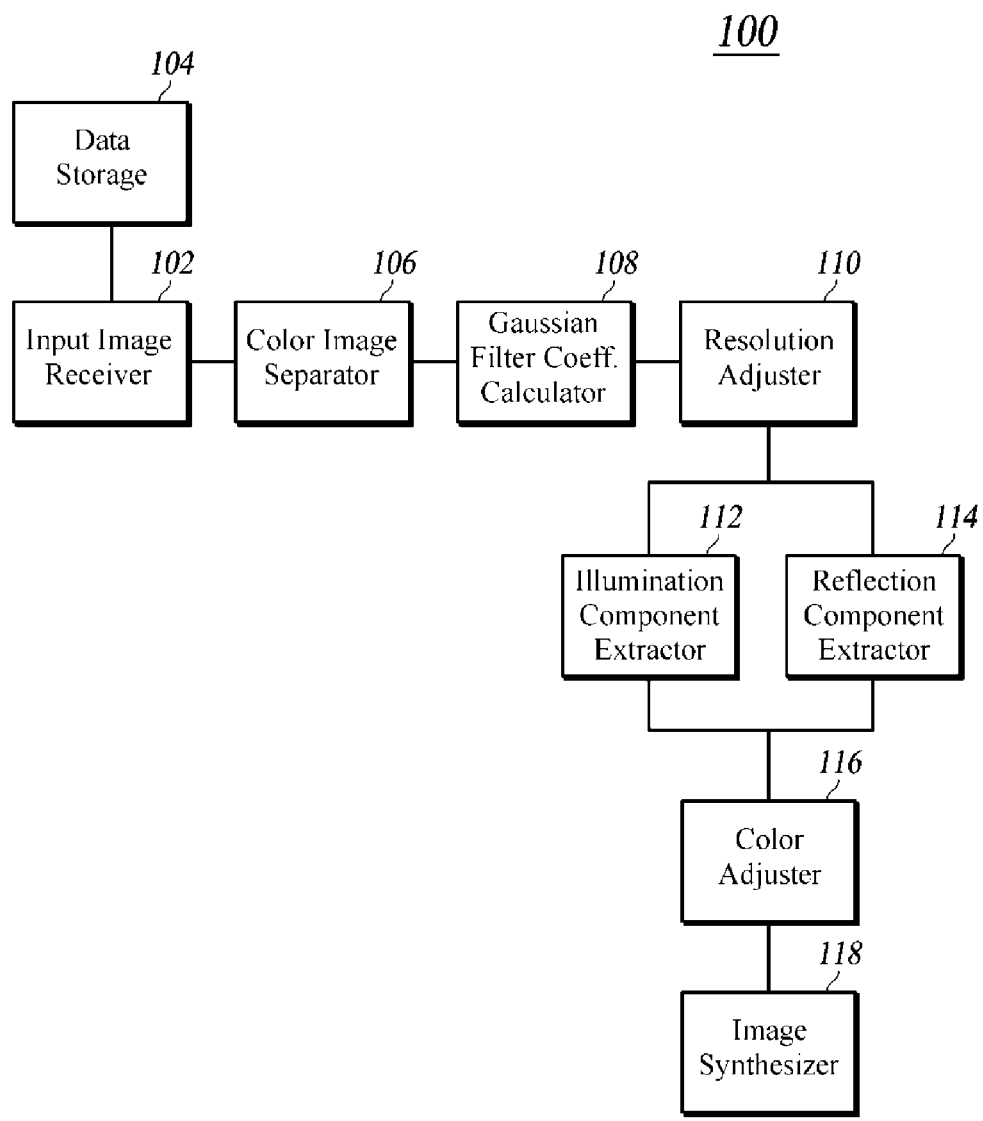
FIG. 1 is a diagram of a configuration of a video correction apparatus for accelerating video compensation, according to at least one embodiment of the present disclosure.

Hereinafter, at least one embodiment of the present disclosure will be described in detail with reference to the accompanying drawings. In the following description, like reference numerals designate like elements, although the elements are shown in different drawings. Further, in the following description of the at least one embodiment, a detailed description of known functions and configurations incorporated herein will be omitted for the purpose of clarity and for brevity.

Additionally, in describing the components of the present disclosure, terms like first, second, A, B, (a), and (b) are used. These are solely for the purpose of differentiating one component from another, and one of ordinary skill would understand that the terms are not to imply or suggest the substances, the order or sequence of the components. If a component is described as "connected", "coupled", or "linked" to another component, one of ordinary skill in the art would understand the components are not necessarily directly "connected", "coupled", or "linked" but also are indirectly "connected", "coupled", or "linked" via a third component.

Some embodiments of the present disclosure provide a video correction apparatus and method for accelerating image compensation, which provide a video image correction device fabricated for extracting and removing an illumination component from an input image received from an image capturer based on Retinex algorithms to emphasize a reflection component, and thereby outputting a corrected image with its dynamic range compressed and its contrast enhanced from the input image, while accelerating the operation performed in the process of extracting the illumination component through preadjustment of the image resolution according to a convolution operation scale value of at least one Gaussian filter for extracting the illumination component and providing image correction in real time regardless of the resolution of the image.

In general, human vision is capable of discerning between structures and surrounding areas, even in blurred video images due to elements such as fog and dust. However, images captured by a video capturing device in such an environment tend to lose most of feature points, and thus fail to exactly reflect the scene recognized through human vision. Various methods are used to recover such feature points to enhance image quality. As one of the methods, the Retinex algorithm designed based on the Retinex theory has an excellent performance on dynamic range compression and color constancy. The processing procedure of the Retinex algorithm uses a Gaussian filter based on logarithmic operations to estimate an illumination component of an input image and remove the illumination component from the input image to obtain a reflectance image containing features of an object. According to at least one embodiment of the present disclosure, a video correction apparatus corrects images based on the Retinex algorithm by pre-adjusting image resolution according to a convolution operation scale value of at least one Gaussian filter for extracting the illumination component. Thereby, the video correction apparatus accelerates the operation performed in the process of extracting the illumination component and receive image correction in real time, regardless of the image resolution.

FIG. 1 is a diagram of a configuration of a video correction apparatus 100 for accelerating video compensation, according to at least one embodiment of the present disclosure.

As shown in FIG. 1, the video correction apparatus 100 for accelerating video compensation includes an input image receiver 102, a data storage 104, a color image separator 106, a Gaussian filter coefficient calculator 108, a resolution adjuster 110, an illumination component extractor 112, a reflection component extractor 114, a color adjuster 116 and an image synthesizer 118. A person having ordinary skill in the pertinent art could appreciate that the components of the video correction apparatus 100 depicted by the input image receiver 102, data storage 104, color image separator 106, Gaussian filter coefficient calculator 108, resolution adjuster 110, illumination component extractor 112, reflection component extractor 114, color adjuster 116 and image synthesizer 118 are illustrative only and are subject to various modifications, additions, and substitutions without departing from the gist and nature of the embodiments of the present disclosure. Other components of the video correction apparatus 100, such as each of the input image receiver 102, the data storage 104, the color image separator 106, the Gaussian filter coefficient calculator 108, the resolution adjuster 110, the illumination component extractor 112, the reflection component extractor 114, the color adjuster 116 and the image synthesizer 118 and the filtering unit 160 is implemented by, or includes, one or more processors and/or application-specific integrated circuits (ASICs). The video correction apparatus 100 further comprises input units (not shown in FIG. 1) such as one or more buttons, a touch screen, a mic and so on, and output units (not shown in FIG. 1) such as a display, an indicator and so on.

The input image receiver 102 receives an input image captured by an image capturer and sends the received input image to the data storage 104 and the Gaussian filter coefficient calculator 108. In other words, the input image receiver 102 receives an image of a specific region captured by a user by using the image capturer. Herein, the input image received by the input image receiver 102 is a color component image containing R, G and B color components or a grayscale image.

The data storage 104 receives the input image captured by the image capturer from the input image receiver 102, and stores the received input image in the database in the data storage 104. Specifically, the data storage 104 receives the input image from the input image receiver 102 and stores the same in the database by determining the size and pixel value of the received input image. The input image is classified according to the information such as the time at which the image was captured and the size of the input image and stored in the data storage 104.

In addition, the data storage 104 stores the received input image by determining information such as the size and pixel values of the input image, and provides the image synthesizer 118 with the stored information. According to some embodiments, the image synthesizer 118 receives the information such as the size and pixel values of the input image stored in the data storage 104 and identifies the resolution of the input image. Then, the image synthesizer 118 readjusts an image resolution produced by summing reflection components based on the information stored in the data storage 104 to a resolution for one color component.

The color image separator 106 separates the received input image into red (R), green (G), and blue (B) images. Specifically, when the received input image includes R, G and B color components, the color image separator 106 extracts the color component images from the input image using a color image decomposition filter (not shown). The color image decomposition filter filters the input image transmitted from the input image receiver 102 such that R, G and B color components are separated from the input image and transmitted. To this end, the color image decomposition filter includes a red filter, a green filter, a blue filter, and at least two mirrors. The mirrors serve to refract an electrical signal transmitted over a transmission path such that the electrical signal passes through each of the three filters (not shown), each of which serves to pass only corresponding color information in the transmitted electrical signal. In other words, the red filter (not shown) passes only information on red in the electrical signal, the green filter (not shown) passes only information on green in the electrical signal, and the blue filter (not shown) passes only information on blue in the electrical signal.

The Gaussian filter coefficient calculator 108 extracts a filter coefficient of at least one Gaussian filter performing a filtering process for extracting an illumination component from one color component image. Herein, the one color component image is one of R, G and B color component images separated by the color image separator 106 or a color component image constructed in gray scale. According to some embodiments, the Retinex algorithm forming the basis of operation of the video correction apparatus 100 applies a Gaussian filter to the input image to estimate the illumination component, and removes the estimated illumination component from the input image, thereby acquiring a reflection component. The filter coefficient of the Gaussian filter, which is a Gaussian center-surround constant representing the standard deviation of a Gaussian distribution, determines the size of the Gaussian filter. If the filter coefficient of the Gaussian filter is set to a high value, the edges of the image are preserved, and thus the local contrast is enhanced, and sensitivity of the low brightness is enhanced. However, the difference in brightness between a low-brightness portion and a high-brightness portion is reduced, and as a result the global contrast is reduced. If the filter coefficient of the Gaussian filter is set to a low value, on the other hand, the difference in brightness between a low-brightness portion and a high-brightness portion is enhanced, and thus the global contrast is improved. In this case, however, the brightness difference in the high-brightness portion is reduced, and thus overall edge components of the image are reduced, resulting in loss of local contrast. A single scale Retinex (SSR) method, which is a Retinex algorithm that uses one Gaussian filter to extract the illumination component, is difficult to adaptively apply to an input image, and has a structural problem of inevitably producing loss of contrast in the process of removing the estimated illumination component. According to some embodiments, the video correction apparatus 100 uses a multi scale Retinex (MSR) algorithm, which is an improved version of the SSR algorithm, to assign weights to SSR output images subjected to at least one Gaussian filter of different sizes and to output a corrected image by synthesizing the weighted images.

Specifically, the Gaussian filter coefficient calculator 108 identifies size information on one color component image from the color component image, and applies a preset ratio, for example, a plurality of different ratios to the size of the color component image, thereby generating color component images of three different sizes, namely, large, medium and small sizes. For example, the Gaussian filter coefficient calculator 108 generates a color component image of a large size corresponding to 3/3 the size of the input image, a color component image of a medium size corresponding to 2/3 the size of the input image, and a color component image of a small size corresponding to 1/3 the size of the input image, according to the preset ratios. Although the color component images of large, medium and small sizes are described as being generated and the corresponding specific ratios are described as being preset, embodiments of the present disclosure are not limited thereto. Various other sizes and ratios are set.

In addition, the Gaussian filter coefficient calculator 108 extracts, based on the generated color component images of three different sizes, namely large, medium and small sizes, a filter coefficient of at least one Gaussian filter capable of filtering the generated color component images respectively and applies the extracted filter coefficient to the at least one Gaussian filter. In other words, the Gaussian filter coefficient calculator 108 identifies the three different sizes, namely large, medium and small sizes of the generated images, and extracts a filter coefficient of at least one Gaussian filter based on the sizes.

The resolution adjuster 110 extracts an optimized resolution value for filtering based on the filter coefficient extracted by the Gaussian filter coefficient calculator 108, and adjusts the resolution of the color component image to the extracted resolution value. Specifically, the resolution adjuster 110 receives the filter coefficient applied to the at least one Gaussian filter extracted by the Gaussian filter coefficient calculator 108, and extracts, based on the received filter coefficient, a resolution value optimized for filtering of a color component image generated in three different sizes of large, medium and small.

Herein, the resolution value optimized for the filter refers to a resolution of the color component image adjusted according to the preset ratios applied in the process of the Gaussian filter coefficient calculator 108 generating images of large, medium and small sizes corresponding to a color component image. In other words, as described above, when a large image of a size corresponding to 3/3 the size of the input image, a medium image of a size corresponding to 2/3 the size of the input image and a small image of a size corresponding to 1/3 the size of the input image are generated, the resolutions of the color component images of the large, medium and small sizes are resolutions adjusted to 1/3, 2/3 and 3/3 the resolution of the existing color component image respectively. According to some embodiments, the video correction apparatus 100 accelerates the operation performed in the process of extracting the illumination component through a preadjustment of the image resolution according to a convolution operation scale value of at least one Gaussian filter for extracting the illumination component, and be provided with image correction in real time, regardless of the image resolution.

The illumination component extractor 112 extracts the illumination component from the color component image with the resolution adjusted. Specifically, the illumination component extractor 112 applies the color component images of large, medium and small sizes with the adjusted resolutions to at least one Gaussian filter, and the at least one Gaussian filter extracts the illumination components for the color component images of large, medium and small sizes with the adjusted resolutions respectively based on the large, medium and small sizes of the color component images with the adjusted resolutions and the filter coefficient.

The illumination component extractor 112 extracts the illumination components for the color component images of large, medium and small sizes with the resolutions adjusted through at least one Gaussian filter using Equation 1 below.

$$I(x,y)=R(x,y) \cdot L(x,y)$$

$$\log I(x,y)=\log R(x,y)+\log L(x,y)$$

$$\log L(x,y)=\log [F(x,y)*I_i(x,y)] \qquad \text{Equation 1}$$

Equation 1 defines an input image based on E. Land's Retinex theory, which postulates that brightness of light perceived by a human is expressed by a multiplication of the illumination component and the reflection component, and the reflection component mainly affects perception of colors, and a process of at least one Gaussian filter extracting illumination components for the color component images of large, medium and small sizes with the adjusted resolutions from the defined equation. In Equation 1, I denotes an input image, (x, y) denotes the pixel coordinates of the image, R denotes the reflection component, and L denotes the illumination component. In Equation 1, the equation of I(x,y)=R(x,y)·L(x,y) is converted into log I(x,y)=log R(x,y)+log L(x,y) according to Weber's law stating that a logarithmic relationship is established between the actual brightness of an input image and the brightness of the image perceived by human vision, and log L(x,y) representing the illumination component is expressed as log[F(x,y)*$I_i$(x,y)]. Herein, $I_i$(x, y) denotes an input image of the i-th color component, * denotes a convolution operator, and F(x,y) denotes a normalized Gaussian center-surround function for estimating the illumination component. F(x,y) is extracted from Equation 2 below.

$$F(x,y) = Ke^{-(x^2+y^2)/c^2}$$

$$\iint F(x,y)dxdy = 1 \qquad \text{Equation 2}$$

In Equation 2, K is a normalization coefficient, and c denotes a Gaussian center-surround constant, which represents the standard deviation of a Gaussian distribution and determines the scale of a Gaussian filter. In other words, by applying the filter coefficient of the at least one Gaussian filter extracted by the Gaussian filter coefficient calculator 108 to Equation 2, log L(x,y) representing the illumination component is extracted.

The reflection component extractor 114 extracts the reflection component of the color component image by removing the illumination component from the pixel values of the color component image. Specifically, the reflection component extractor 114 extracts the reflection components for the color component images of large, medium and small sizes, by removing, from the pixel values of the color component images of large, medium and small sizes, the illumination components for the color component images of large, medium and small sizes extracted by the illumination component extractor 112. The reflection component extractor 114 removes the illumination components from the pixel values of the color component images of large, medium and small sizes using Equation 3 given below.

$$R_i(x,y) = \log I_i(x,y) - \log[F(x,y)*I_i(x,y)] \qquad \text{Equation 3}$$

In Equation 3, i denotes color components R, G and B of an input image, $R_i$(x,y) denotes an SSR output image representing the reflection component of the i-th color component. In other words, the illumination component is removed from each of the color component images of three sizes of large, medium and small separated through Equation 3. Thereby, a reflection component for each of the color component images of the three sizes is extracted. Although Equation 3 illustrates a method for removing illumination components when the input image is a color component image including the R, G, B color components, the method is also be applied to a grayscale input image.

The reflection component extractor 114 assigns weights to SSR output images representing the reflection components for the color component images of the three sizes of large, medium and small extracted through Equation 3, and finally extracts the reflection component of the color component images by synthesizing the weighted images. The reflection component extractor 114 extracts the reflection components of the color component images of three sizes of large, medium and small by assigning weights to the SSR output images using Equation 4 given below.

$$R_{MSR_i}(x, y) = \sum_{k=1}^{N} W_k R_{k_i}(x, y), \quad \sum_{k=1}^{N} W_k = 1 \qquad \text{Equation 4}$$

In Equation 4, $R_{MSRi}$(x,y) denotes an output image of the MSR algorithm for the i-th color component, N denotes the number of Gaussian filters of different sizes, $R_{ki}$(x,y) denotes an SSR algorithm output image of the i-th color component generated by the k-th Gaussian filter. $W_k$ denotes a weight to be applied to the k-th SSR image, and the sum of all weights is 1. Although Equation 4 represents a method for removing the illumination components when the input image is a color component image including R, G and B color components, the method is also applied to a grayscale input image.

Among the three filters of large, medium and small sizes, the filter of the small size is used to obtain a detailed contour of an input image, and the filter of the large size is used to maintain the overall difference in brightness of the input image and provide color constancy. The filter of the medium size serves to connect the filter of the large size with the filer of the small size by combining the features of the two filters. In other words, weights are assigned to the reflection components extracted through the individual filters according to the functions of the filters, thereby finally extracting a reflection component of the color component image.

Since the SSR algorithm and the MSR algorithm independently apply to each color component of the input image, correlation between the color components is not considered. Accordingly, if or when the ratios of the color components of the output image are almost similar to each other, graying-out of the output image occurs, which means that the color of the output image is gray. To address this problem with an input image including R, G and B color components, the reflection component extractor 114 additionally performs the process described in Equation 5 given below.

$$R_{MSRCR_i}(x, y) = C_i(x, y) R_{MSR_i}(x, y) \qquad \text{Equation 5}$$

$$I'_i(x, y) = I_i(x, y) / \sum_{i=1}^{S} I_i(x, y)$$

$$C_i(x, y) = \beta \log[\alpha I'_i(x, y)], \; i \in R, G, B$$

In Equation 5, $R_{MSRCRi}$(x,y) denotes an MSRCR (MSR With Color Restoration) image of the i-th color component having undergone color restoration, $R_{MSRi}$(x,y) denotes an MSR image of the i-th color component, and $C_i$(x,y) denotes the color restoration function of the i-th color component. In the equation for $C_i$(x,y), I'$_i$(x,y) denotes an input image of the i-th color component normalized according to the ratio of each color component to reflect a correlation between the color components, S denotes the number of color components, and α and β denote color gain constants.

The color adjuster 116 generates a sum image by adding the reflection component to a color component image. Specifically, the color adjuster 116 receives the reflection components of the color component images from the reflection component extractor 114. When the input image is a color component image including R, G and B color components, the color adjuster 116 adds the received reflection components of the color component images to the R, G and B images extracted by the color image separator 106. When the input image is a grayscale image, the color adjuster 116 adds the received reflection component to the grayscale image.

The reflection components of the color component images extracted by the reflection component extractor 114 have a positive or negative numerical value, and an image with the reflection components emphasized is generated by adding the numerical values to the pixel values of the existing color component images. In other words, according to this embodiment, the image quality of the color component images is enhanced to be close to the image quality of an image perceived through human vision by emphasizing the reflection components containing features of an object in the existing color component images.

The image synthesizer 118 receives the color component images obtained by adding the reflection components from the color adjuster 116, and readjusts the resolutions of the color component images to that of the input image. Herein, the resolution of the input image is determined from the information such as the size, pixel value and the like of the input image stored in the data storage 104. The image synthesizer 118 re-calculates the resolution of the existing input image based on this information, thereby directly adjusting the resolution of the color component images without performing the existing processes of adjusting the resolutions of the color component images. In other words, according to this embodiment, the time consumed to perform operations occurring during recalculation of the resolution of the input image is reduced. Thereafter, the image synthesizer 118 outputs a corrected image for the input image by synthesizing the color component images with the readjusted resolutions.

If the input image is a color component image including R, G and B color components, the image synthesizer 118 readjusts the resolution of the image generated by the color adjuster 116 to the resolution of the color component image, and synthesizes the generated image with the images readjusted for the two remaining ones of the R, G and B color components to generate a corrected image corresponding to the input image.

Figure 2A:
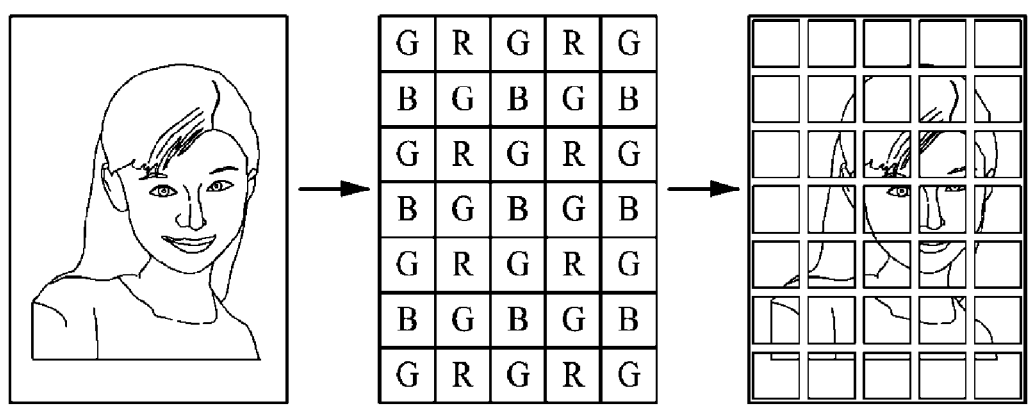
FIG. 2A is a diagram of an exemplary process of separating an input image into R, G and B images, according to at least one embodiment of the present disclosure.
Figure 2B:
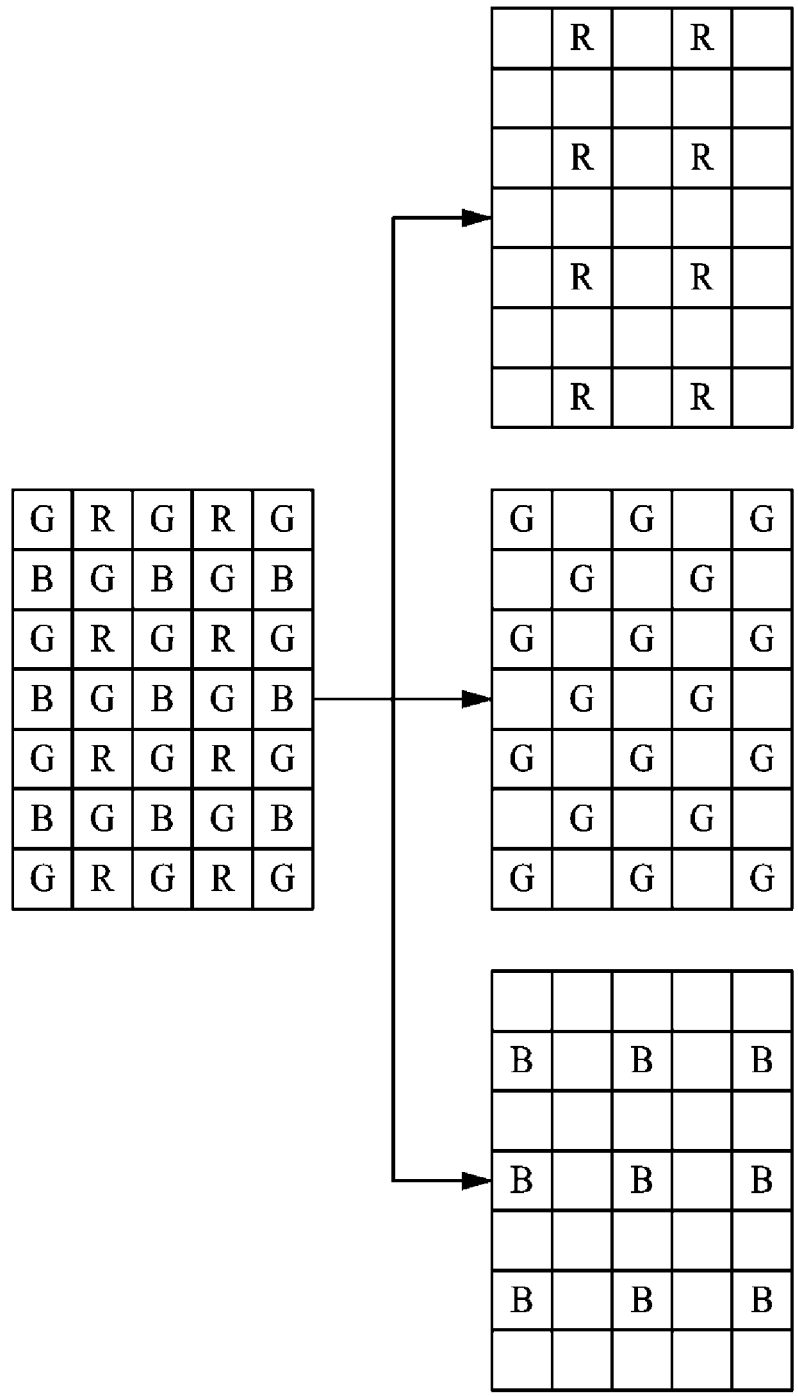
FIG. 2B is a diagram of an exemplary process of extracting an image for each of the color components R, G and B from an input image separated into R, G and B images, according to at least one embodiment of the present disclosure.

FIG. 2A is a diagram of an exemplary process of separating an input image into R, G and B images in one or more embodiments, and FIG. 2B is a diagram of an exemplary process of extracting an image for each of the color components R, G and B from the input image separated into R, G and B images in one or more embodiments.

As shown in FIGS. 2A and 2B, when an input image is constructed by R, G and B color components, the input image includes the R, G and B color components. The RGB color information contained in the input image is extracted in the form of R, G and B images. According to some embodiments, the color image separator 106 serves to extract the R, G and B images. The color image separator 106 separates the R, G and B images from the received input image. Specifically, when the received input image contains color components, the color image separator 106 extracts color component images included in the input image using a color image decomposition filter (not shown). The color image decomposition filter filters the input image transmitted from the input image receiver 102 such that R, G and B color components are separated from the input image and transmitted. To this end, the color image decomposition filter includes a red filter, a green filter, a blue filter, and at least two mirrors. The mirrors serve to refract an electrical signal transmitted over a transmission path such that the electrical signal passes through each of the three filters (not shown), each of which serves to pass only the corresponding color information in the transmitted electrical signal.

Figure 3:
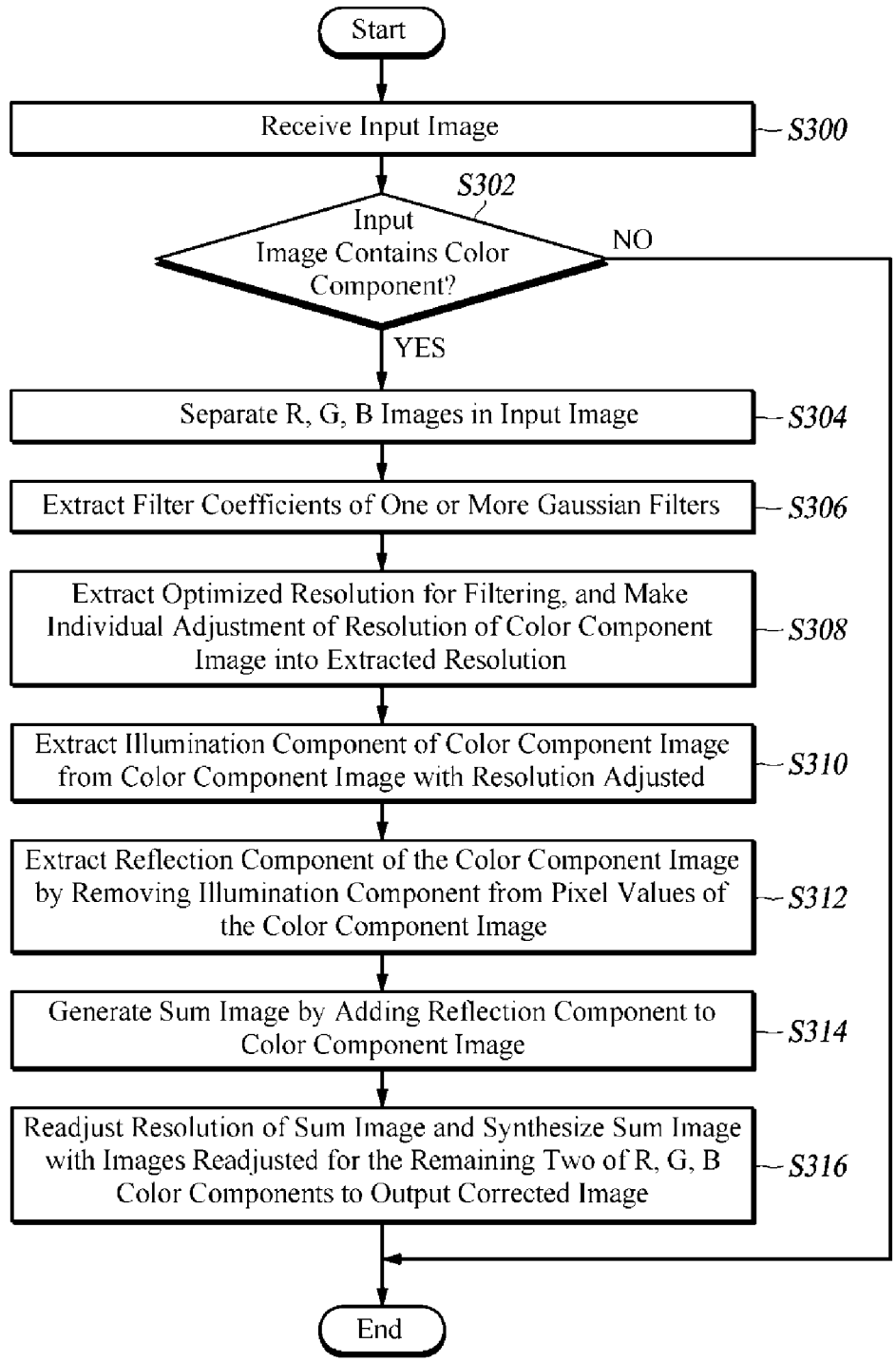
FIG. 3 is a flowchart of a method, performed by a video correction apparatus, for correcting an input image containing color components, according to at least one embodiment of the present disclosure.

FIG. 3 is a flowchart of a method, performed by the video correction apparatus 100, for correcting an input image containing color components in one or more embodiments. In FIG. 3, the color components represent R, G and B.

As shown in FIG. 3, when the method for correcting an input image containing color components begins to be implemented by the video correction apparatus 100, an input image is received from an image capturer (S300), and then it is determined whether or not the received input image contains a color component (S302). Specifically, the input image receiver 102 receives an image of a specific region captured by a user using the image capturer, and determines whether or not the received image contains a color component. The input image received by the input image receiver 102 is an image implemented with a specific size and a specific resolution according to the preset function of the image capturer. The image is implemented in various sizes and resolutions depending on the configurations established by the user and the function of the image capturer. The information on the input image received from the input image receiver 102 is stored in the data storage 104.

The color image separator 106 separates the received input image into R, G and B images (S304). Specifically, when the received input image includes color components, the color image separator 106 extracts the color component images from the input image using a color image decomposition filter (not shown). The color image decomposition filter filters the input image transmitted from the input image receiver 102 such that R, G and B color components are separated from the input image and transmitted. To this end, the color image decomposition filter includes a red filter, a green filter, a blue filter, and at least two mirrors. The mirrors serve to refract an electrical signal transmitted over a transmission path such that the electrical signal passes through each of the three filters (not shown), each of which serves to pass only the corresponding color information in the transmitted electrical signal. In other words, the red filter (not shown) passes only information on red in the electrical signal, the green filter (not shown) passes only information on green in the electrical signal, and the blue filter (not shown) passes only information on blue in the electrical signal.

The Gaussian filter coefficient calculator 108 extracts a filter coefficient of at least one Gaussian filter performing a filtering process for extracting an illumination component from one color component image separated by the color image separator 106 (S306). Specifically, the Gaussian filter coefficient calculator 108 identifies, from the color component image separated by the color image separator 106, the size information on the color component image, and generates images of three different sizes, namely, large, medium and small sizes corresponding to the color component image, according to preset ratios of the size of the color component image. For example, the Gaussian filter coefficient calculator 108 generates a color component image of a large size corresponding to 3/3 the size of the input image, a color component image of a medium size corresponding to 2/3 the size of the input image, and a color component image of a small size corresponding to 1/3 the size of the input image, according to the preset ratios. Although the color component images of large, medium and small sizes are described as being generated and the corresponding specific ratios are described as being preset, embodiments of the present disclosure are not limited thereto. Various other sizes and ratios are set. In addition, the Gaussian filter coefficient calculator 108 extracts, based on the generated color component images of three different sizes, namely large, medium and small sizes, a filter coefficient of at least one Gaussian filter capable of filtering the generated color component images respectively and applies the extracted filter coefficient to the at least one Gaussian filter.

The resolution adjuster 110 extracts an optimized resolution value for filtering based on the filter coefficient extracted by the Gaussian filter coefficient calculator 108, and adjusts the resolution of the color component image to the extracted resolution value (Step S308). Specifically, the resolution adjuster 110 receives the filter coefficient applied to the at least one Gaussian filter and extracted by the Gaussian filter coefficient calculator 108, and extracts, based on the received filter coefficient, an optimized resolution value for filtering the color component images generated in three different sizes of large, medium and small sizes. Herein, the optimized resolution value for the filtering refers to a resolution of the color component images adjusted according to the preset ratios applied when the Gaussian filter coefficient calculator 108 generates color component images of large, medium and small sizes. As described above, when a large image of a size corresponding to 3/3 the size of the input image, a medium image of a size corresponding to 2/3 the size of the input image and a small image of a size corresponding to 1/3 the size of the input image are generated, the resolutions of the color component images of the large, medium and small sizes are resolutions adjusted to 1/3, 2/3 and 3/3 the resolution of the existing color component image respectively.

The illumination component extractor 112 extracts the illumination component from the color component images with the resolutions adjusted (S310). Specifically, the illumination component extractor 112 applies the color component images of large, medium and small sizes with the adjusted resolutions to at least one Gaussian filter, and the at least one Gaussian filter extracts the illumination components for the color component images of large, medium and small sizes with the adjusted resolutions respectively based on the large, medium and small sizes of the color component images with the adjusted resolutions and the filter coefficient. The illumination components for the color component images of large, medium and small sizes with the resolutions adjusted through at least one Gaussian filter is extracted using Equations 1 and 2.

The reflection component extractor 114 extracts the reflection components of the color component images by removing the illumination components from the pixel values of the color component image (S312). Specifically, the reflection component extractor 114 extracts the reflection components for the color component images of large, medium and small sizes, by removing, from the pixel values of the color component images of large, medium and small sizes, the illumination components for the color component images of large, medium and small sizes extracted by the illumination component extractor 112. The reflection component extractor 114 removes the illumination components from the pixel values of the color component images of large, medium and small sizes using Equation 3. In addition, the reflection component extractor 114 assigns weights to SSR output images representing the reflection components for the R, G and B images of the three sizes of large, medium and small extracted through Equation 3, and finally extracts the reflection components of the color component images by synthesizing the weighted images. The reflection component extractor 114 extracts the reflection components of the R, G and B images of three sizes of large, medium and small by assigning weights to the SSR output images using Equation 4. Since the SSR algorithm and the MSR algorithm independently apply to each color component of the input image, correlation between the color components is not considered. Accordingly, if the ratios of the color components of the output image are almost similar to each other, graying-out of the output image occurs, which means that the output image is expressed in gray. To address this problem with an input image including color components, the reflection component extractor 114 additionally performs the process described in Equation 5.

The color adjuster 116 generates a sum image by adding the reflection components to the color component images (S314). Specifically, the color adjuster 116 receives the reflection component of the R, G and B images from the reflection component extractor 114, and adds the received reflection component of the R, G and B images to the R, G and B images extracted by the color image separator 106. The reflection components of the R, G and B images extracted by the reflection component extractor 114 have a positive or negative numerical value, and an image with the reflection components emphasized is generated by adding the numerical values to the pixel values of the existing R, G and B component images. In other words, according to this embodiment, the image quality of the R, G and B images is enhanced to be close to the image quality of an image perceived through human vision by emphasizing the reflection components containing features of an object in the existing R, G and B images.

The image synthesizer 118 readjusts the resolution of the sum image, and synthesizes the readjusted image with the images readjusted for the two remaining ones of the R, G and B color components to output a corrected image (S316). Specifically, the image synthesizer 118 receives the R, G and B images obtained by adding the reflection components from the color adjuster 116, and readjusts the resolutions of the R, G and B images to that of the input image. Herein, the resolution of the input image is determined from the information such as the size, pixel value and the like of the input image stored in the data storage 104. The image synthesizer 118 re-calculates the resolution of the existing input image based on this information, thereby directly adjusting the resolution of the R, G and B images without performing the existing processes of adjusting the resolutions of the R, G and B images. In other words, according to this embodiment, the time consumed to perform operations in the process of recalculation of the resolution of the input image is reduced. Thereafter, the image synthesizer 118 outputs a corrected image for the input image by synthesizing the R, G and B images with the readjusted resolutions.

Figure 4:
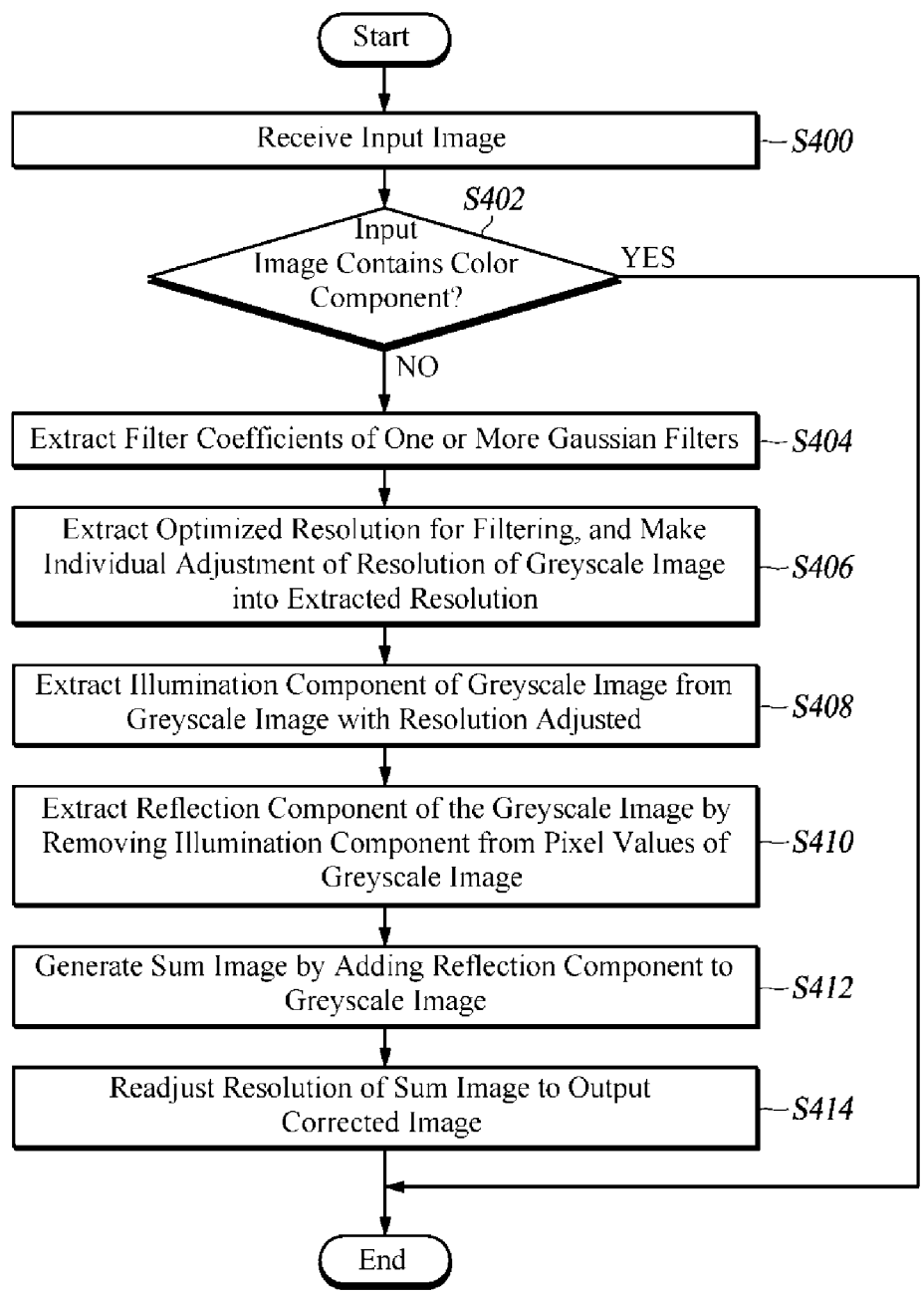
FIG. 4 is a flowchart of a method, performed by a video correction apparatus, for correcting an input image containing no color components, according to at least one embodiment of the present disclosure.

FIG. 4 is a flowchart of a method, performed by a video correction apparatus, for correcting an input image containing no color components in one or more embodiments. In FIG. 4, the color components represent R, G and B.

As shown in FIG. 4, when the method for correcting an input image containing no color components begins to be implemented by the video correction apparatus 100, an input image is received from an image capturer (S400), and then it is determined whether or not the received input image contains a color component (S402). Specifically, the input image receiver 102 receives an image of a specific region captured by a user by using the image capturer, and determines whether or not the received image contains a color component. The input image received by the input image receiver 102 is an image implemented with a specific size and a specific resolution according to the preset function of the image capturer. The image is implemented in various sizes and resolutions depending on the configurations established by the user and the function of the image capturer. The information on the input image received from the input image receiver 102 is stored in the data storage 104.

When the input image is a grayscale image that does not contain a color component, the Gaussian filter coefficient calculator 108 extracts a filter coefficient of at least one Gaussian filter performing a filtering process for extracting an illumination component from the grayscale image (S404). Specifically, the Gaussian filter coefficient calculator 108 identifies the size information on the grayscale image through the input image receiver 102, and generates images of three different sizes, namely, large, medium and small sizes corresponding to the grayscale image, according to preset ratios of size. For example, the Gaussian filter coefficient calculator 108 generates a grayscale image of a large size corresponding to 3/3 the size of the input image, a grayscale image of a medium size corresponding to 2/3 the size of the input image, and a grayscale image of a small size corresponding to 1/3 the size of the input image. Although the grayscale images of large, medium and small sizes are described as being generated and the corresponding specific ratios are described as being preset, embodiments of the present disclosure are not limited thereto. Various other sizes and ratios are set. In addition, the Gaussian filter coefficient calculator 108 extracts, based on the generated grayscale images of three different sizes, namely large, medium and small sizes, a filter coefficient of at least one Gaussian filter capable of filtering the generated grayscale images respectively and applies the extracted filter coefficient to the at least one Gaussian filter.

The resolution adjuster 110 extracts an optimized resolution value for filtering based on the filter coefficient extracted by the Gaussian filter coefficient calculator 108, and adjusts the resolutions of the generated grayscale images three sizes of large, medium and small to the extracted resolution value (S406). Specifically, the resolution adjuster 110 receives the filter coefficient applied to the at least one Gaussian filter and extracted by the Gaussian filter coefficient calculator 108, and extracts, based on the received filter coefficient, an optimized resolution value for filtering the grayscale images generated in three different sizes of large, medium and small. Herein, the optimized resolution value for the filtering refers to a resolution of the grayscale images adjusted according to the preset ratios applied when the Gaussian filter coefficient calculator 108 generates grayscale images of large, medium and small sizes. As described above, when a large image of a size corresponding to 3/3 the size of the input image, a medium image of a size corresponding to 2/3 the size of the input image and a small image of a size corresponding to 1/3 the size of the input image are generated, the resolutions of the grayscale images of the large, medium and small sizes are resolutions adjusted to 1/3, 2/3 and 3/3 the resolution of the existing grayscale image respectively.

The illumination component extractor 112 extracts the illumination component from the grayscale images with the resolution adjusted (S408). Specifically, the illumination component extractor 112 applies the grayscale images of large, medium and small sizes with the adjusted resolutions to at least one Gaussian filter, and the at least one Gaussian filter extracts the illumination components for the grayscale images of large, medium and small sizes with the adjusted resolutions respectively based on the large, medium and small sizes of the grayscale images with the adjusted resolutions and the filter coefficient. The illumination components for the grayscale images of large, medium and small sizes with the resolutions adjusted through at least one Gaussian filter are extracted using Equations 1 and 2.

The reflection component extractor 114 extracts the reflection components of the grayscale images by removing the illumination components from the pixel values of the color component images (S410). Specifically, the reflection component extractor 114 extracts the reflection components for the grayscale images of large, medium and small sizes, by removing, from the pixel values of the grayscale images of large, medium and small sizes, the illumination components for the grayscale images of large, medium and small sizes extracted by the illumination component extractor 112. The reflection component extractor 114 removes the illumination components from the pixel values of the grayscale images of large, medium and small sizes using Equation. In addition, the reflection component extractor 114 assigns weights to SSR output images representing the reflection components for the grayscale images of the three sizes of large, medium and small extracted through Equation 3, and finally extracts the reflection components of the grayscale images by synthesizing the weighted images. The reflection component extractor 114 extracts the reflection components of the grayscale images of three sizes of large, medium and small by assigning weights to the SSR output images using Equation 4.

The color adjuster 116 generates a sum image by adding the reflection components to the grayscale images (S412). Specifically, the color adjuster 116 receives the reflection component of the grayscale images from the reflection component extractor 114, and adds the received reflection component of the grayscale images to the grayscale images received through the input image receiver 102. The reflection components of the grayscale images extracted by the reflection component extractor 114 have a positive or negative numerical value, and an image with the reflection components emphasized is generated by adding the numerical values to the pixel values of the existing grayscale images. In other words, according to this embodiment, the image quality of the grayscale images is enhanced to be close to the image quality of an image perceived through human vision by emphasizing the reflection components containing features of an object in the existing grayscale images.

The image synthesizer 118 readjusts the resolution of the sum image to output a corrected image (S414). Specifically, the image synthesizer 118 receives the grayscale images obtained by adding the reflection components from the color adjuster 116, and readjusts the resolutions of the grayscale images to that of the input image. Herein, the resolution of the input image is determined from the information such as the size, pixel value and the like of the input image stored in the data storage 104. The image synthesizer 118 recalculates the resolution of the existing input image based on this information, thereby directly adjusting the resolution of the grayscale images without performing the existing processes of adjusting the resolutions of the grayscale images. In other words, according to this embodiment, the time consumed to perform operations occurring during recalculation of the resolution of the input image is reduced. Thereafter, the image synthesizer 118 outputs a corrected image for the input image by synthesizing the grayscale images with the readjusted resolutions.

Although Steps S300 to S316 in FIG. 3 and Steps S400 to S414 in FIG. 4 are described as being sequentially performed, merely to illustrate a technical idea of some embodiments of the present disclosure, a person having ordinary skill in the pertinent art could appreciate that various modifications, additions, and substitutions are possible by changing the sequences described in FIGS. 3 and 4 or by executing two or more steps from S300 to S316 and S400 to S414 in parallel, without departing from the gist and the nature of the embodiments of the present disclosure, and hence FIGS. 3 and 4 are not limited to the illustrated chronological sequence.

According to various embodiments of the present disclosure as described above, image compensation, which provide a video image correction device fabricated for extracting and removing an illumination component from an input image received from an image capturer based on Retinex algorithms to emphasize a reflection component, is accelerated, thereby outputting a corrected image with its dynamic range compressed and its contrast enhanced from the input image, while accelerating the operation performed in the process of extracting the illumination component through preadjustment of the image resolution according to a convolution operation scale value of at least one Gaussian filter for extracting the illumination component and providing image correction in real time regardless of the resolution of the image.

Although exemplary embodiments of the present disclosure have been described for illustrative purposes, those skilled in the art will appreciate that various modifications, additions and substitutions are possible, without departing from the spirit and scope of the claimed invention. Specific terms used in this disclosure and drawings are used for illustrative purposes and not to be considered as limitations of the present disclosure. Therefore, exemplary embodiments of the present disclosure have been described for the sake of brevity and clarity. Accordingly, one of ordinary skill would understand that the scope of the claimed invention is not limited by the explicitly described above embodiments but by the claims and equivalents thereof.

What is claimed is:

1. A video correction apparatus, comprising:
   a resolution adjuster configured to
      determine one or more resolution values and a filter coefficient of at least one filter for performing filtering process for extracting an illumination component from a color component of an input image, and
      adjust an initial resolution of the color component of the input image to the one or more resolution values to generate one or more resolution-adjusted images;
   an illumination component extractor configured to extract one or more illumination components from the one or more resolution-adjusted images by using the one or more resolution-adjusted images the at least one filter;
   a reflection component extractor configured to extract one or more reflection components of the one or more resolution-adjusted images by removing the one or more illumination components from the one or more resolution-adjusted images;
   a color adjuster configured to generate one or more sum images by using the one or more reflection components and the one or more resolution-adjusted images; and
   an image synthesizer configured to
      generate one or more readjusted images by readjusting the one or more resolutions of the one or more sum images to the initial resolution of the color component of the input image, and
      generate a corrected image corresponding to the color component of the input image by using the one or more readjusted images.

2. The video correction apparatus of claim 1, further comprising:
   a color image separator configured to separate a received input image into red (R), green (G), and blue (B) color component images,
   wherein the color component of the input image is one of the separated R, G and B color component images, and
   the image synthesizer is configured to synthesize the corrected image corresponding to the color component of the input image and corrected images corresponding to other two color components of the separated R, G and B color component images to generate a synthesized image.

3. The video correction apparatus of claim 1, wherein the resolution adjuster is configured to
   identify size information on the color component of the input image, and
   individually generate the one or more resolution-adjusted images having different sizes by applying a plurality of different ratios to a size of the color component image based on the identified size information.

4. The video correction apparatus of claim 3, wherein the filter coefficient of the at least one filter is generated based on the one or more resolutions.

5. The video correction apparatus of claim 1, wherein the resolution adjuster is configured to extract, based on the filter coefficient, the one or more resolution values for generating the one or more resolution-adjusted images having the different sizes.

6. The video correction apparatus of claim 1, wherein the one or more resolution values are extracted based on the plurality of different ratios applied to generate the one or more resolution-adjusted images having the different sizes.

7. The video correction apparatus of claim 1, wherein the illumination component extractor is configured to apply each filter corresponding to each of the one or more resolution values to each of the one or more resolution-adjusted images to thereby extract each of the one or more illumination components for each of the one or more resolution-adjusted images.

8. The video correction apparatus of claim 1, wherein the reflection component extractor is configured to subtract each of the illumination components from each of the one or more resolution-adjusted images having the different sizes to thereby extract each of the one or more reflection components for each of the one or more resolution-adjusted images having the different sizes.

9. The video correction apparatus of claim 1, wherein the image synthesizer is configured to
   assign each weight to each of the one or more readjusted images, and
   generate the corrected image corresponding to the color component of the input image by summing up the one or more readjusted images based on each weight of the one or more readjusted images.

10. The video correction apparatus of claim 1, wherein the color component of the input image is a grayscale image.

11. The video correction apparatus of claim 1, further comprising:
    a data storage configured to store information on some or all of a size and pixel values of the color component of the input image,
    wherein the image synthesizer is configured to readjust the one or more resolutions of the one or more sum images to the initial resolution of the color component of the input image based on the information stored in the data storage.

12. A video correction method performed by a video correction apparatus including a resolution adjuster, an illumination component extractor, a reflection component extractor, a color adjuster, and an image synthesizer, the method comprising:
  performing a resolution adjustment by the resolution adjuster comprising:
    determining one or more resolution values and a filter coefficient of at least one filter for performing filtering process for extracting an illumination component from a color component of an input image, and
    adjusting an initial resolution of the color component of the input image to the one or more resolution values to generate one or more resolution-adjusted images;
  extracting one or more illumination components from the one or more resolution-adjusted images by using the one or more resolution-adjusted images and the at least one filter, by the illumination component extractor;
  extracting one or more reflection components of the one or more resolution-adjusted images by removing the one or more illumination components from the one or more resolution-adjusted images, by the reflection component extractor;
  generating one or more sum images by using the one or more reflection components and the one or more resolution-adjusted images, by the color adjuster; and
  performing an image synthesis by the image synthesizer comprising:
    generating one or more readjusted images by readjusting the one or more resolutions of the one or more sum images into the initial resolution of the color component of the input image, and
    generating a corrected image corresponding to the color component of the input image by using the one or more readjusted images.

13. The method of claim 12, further comprising
separating a received input image into red (R), green (G), and blue (B) color component images,
wherein the color component of the input image is one of the R, G and B color component images, and
the generating of the corrected image comprises
  synthesizing the corrected image corresponding to the color component of the input image and corrected images corresponding to other two color components of the separated R, G and B color component images to generate a synthesized image.

14. The method of claim 12, wherein the performing of the resolution adjustment comprises:
  identifying size information on the color component of the input image; and
  individually generating the one or more resolution-adjusted images having different sizes by applying a plurality of different ratios to a size of the color component image based on the identified size information.

15. The method of claim 14, wherein the filter coefficient of the at least one filter is generated based on the one or more resolutions.

16. The method of claim 12, wherein the one or more resolution values are extracted based on the plurality of different ratios applied to generate the one or more resolution-adjusted images having the different sizes.

17. The method of claim 12, wherein the extracting of the one or more illumination components comprises:
  applying each filter corresponding to each of the one or more resolution values to each of the one or more resolution-adjusted to thereby extract each of the one or more illumination components for each of the one or more resolution-adjusted images.

18. The method of claim 12, wherein, when the color component of the input image is a grayscale image, the one or more illumination components are extracted based on one or more resolution-adjusted grayscale images having different sizes.

19. The method of claim 12, wherein the extracting of the one or more reflection component comprises:
  subtract each of the illumination components from each of the one or more resolution-adjusted images having the different sizes to thereby extract each of the one or more reflection components for each of the one or more resolution-adjusted images having the different sizes.

20. The method of claim 12, wherein the performing of the image synthesis comprises:
  assigning each weight to each of the one or more readjusted images, and
  generate the corrected image corresponding to the color component of the input image by summing up the one or more readjusted images based on each weight of the one or more readjusted images.

* * * * *